United States Patent [19]

Patel

[11] 3,708,864
[45] Jan. 9, 1973

[54] METHOD OF FORMING A WELD FITTING

[75] Inventor: Hiralal V. Patel, Cleveland, Ohio

[73] Assignee: The Weatherhead Company, Cleveland, Ohio

[22] Filed: June 22, 1971

[21] Appl. No.: 155,585

Related U.S. Application Data

[62] Division of Ser. No. 885,018, Dec. 15, 1969, Pat. No. 3,635,498.

[52] U.S. Cl. ..........................29/479, 29/475, 29/478
[51] Int. Cl. .............................................B23k 31/02
[58] Field of Search....29/471.1, 474.3, 472.1, 473.3, 29/475, 478, 479

[56] References Cited

UNITED STATES PATENTS

| | | | |
|---|---|---|---|
| 2,308,307 | 1/1943 | Robinson | 29/471.1 X |
| 2,943,387 | 7/1960 | Dawson | 29/471.1 |
| 3,205,573 | 9/1965 | Seal et al. | 29/479 X |
| 3,248,134 | 4/1966 | Pennington | 29/479 X |

Primary Examiner—Robert D. Baldwin
Assistant Examiner—Richard Bernard Lazarus
Attorney—McNenny, Farrington, Pearne and Gordon

[57] ABSTRACT

A coupling for use in forming a welded tube joint is disclosed along with a method for forming such joint. A thin coupling sleeve is tightly swage-fitted onto the end of a tube to form a male or female tube end assembly suitable for engagement with a tubular mating part assembly which may be a fitting or another coupling sleeve and tube assembly. The male-female interlocking arrangement provides radial and axial alignment of the joined assemblies. The structure is arranged to provide a space between the tube end face and the interior end face of the tubular mating part assembly. During the welding operation, external fusion heat is applied to form a single weld bead extending from the interior of the tube to the exterior surfaces of the assemblies. The width of the weld at its inner radial extremities is longer than the axial width of the space between the interior end faces and its width at its outer radial extremities is at least equal to twice the axial length of the male-female telescoped portion so that all the members are fused into a single unitary structure.

7 Claims, 4 Drawing Figures

PATENTED JAN 9 1973

3,708,864

INVENTOR.
HIRALAL V. PATEL
BY

ATTORNEYS

METHOD OF FORMING A WELD FITTING

This application is a division of application Ser. No. 885,018, filed Dec. 15, 1969 now U.S. Pat. No. 3,635,498 granted Jan. 18, 1972.

BACKGROUND OF THE INVENTION

This invention relates generally to tube couplings and more particularly to a novel and improved welded tube coupling and a method for making such a coupling.

PRIOR ART

Various types of welded tube couplings are known. For example, the U.S. Pat. Nos. 3,194,936; 3,248,134; and 3,439,941 all relate to such couplings. The Nicol U.S. Pat. No. 3,439,941, assigned to the assignee of the present invention, illustrates a coupling arrangement which is particularly useful for use with high strength tubing such as precipitation hardened stainless steel and the like. In the Nicol structure, sleeves are positioned on the ends of tubes and the sleeves are provided with interfitting mating end surfaces arranged to insure radial and axial alignment of the coupling halves prior to welding. The sleeves cooperate to support the tube ends in the area of the connecting welds so that the welded coupling provides a joint which is at least substantially as strong as the tubing itself and is capable of reliably absorbing the loads applied to the tubing system.

Although couplings as disclosed by Nicol are very satisfactory for use with tubing formed of many types of materials, difficulties are sometimes encountered when such a coupling arrangement is utilized in conjunction with tubing formed of materials having certain physical properties such as high notch sensitivity, relatively low rates of heat conductivity, and relatively high sensitivity to contamination difficulties. When, for example, the structure as disclosed in Nicol is utilized to join tubing formed of titanium or titanium alloys, difficulty can be encountered because such tubing is extremely notch sensitive and is susceptible to damage in the areas of any stress concentrations. Similarly, the relatively thick wall thickness required, from a practical standpoint, in the sleeves of the Nicol device in order to provide the male-female relationship illustrated therein, tends to result in weld puddle control problems because of the high energy input required for penetration of the thick section.

SUMMARY OF THE INVENTION

A welded tube coupling in accordance with the present invention is particularly suitable for use with tubing formed of materials which tend to have relatively high notch sensitivity, tend to have a relatively low heat conductivity, and tend to be relatively sensitive to contamination problems.

In accordance with one embodiment of this invention, a coupling includes two coupling halves each provided with a sleeve positioned around the tube end and axially located with respect thereto so that one sleeve projects beyond the associated tube end and the other sleeve is spaced back from its associated tube end. This structure is arranged so that a male-female arrangement is provided in which the exterior of the surface of the tube of the male coupling is proportioned to telescope into the sleeve of the female coupling half to provide radial alignment between the two coupling halves prior to welding. The ends of the sleeves abut to provide axial location between the two coupling halves.

In such embodiment, the structure is arranged so that the two tube ends are spaced a predetermined distance apart when the sleeve ends abut to facilitate purging of the coupling to eliminate contamination problems in the weld.

With this structure wherein the tube coacts with its associated sleeve to provide the only interfitting surfaces, the sleeve can be formed with substantially any desired thickness and can, if desired, be formed with a very thin wall section. Preferably, the relationship between the wall thickness of the sleeve and the wall thickness of the tube is selected so that the sleeves provide sufficient support for the tube ends to compensate for the weakening of the tube end material caused by the heat of welding without providing excessive rigidity which would produce undesirable notch sensitivity problems. Further, such relationship can be selected so that the amount of heat required to fuse the two couplings together is not sufficiently high to cause puddle control problems. When the coupling in accordance with this invention is used with titanium or titanium alloy tubing, good results are obtained with the wall thickness of the tubes is about three times the wall thickness of the sleeve.

In accordance with the preferred method of assembling the sleeves on the tubes the sleeves are initially formed with sufficient clearance so that they can be easily slipped over the ends of the tube and the tube is then radially expanded into tight engagement with the sleeve to frictionally lock the sleeve with respect to the associated tube. Such internal swaging is particularly desirable when the sleeve has a wall thickness less than the wall thickness of the tube and results in an assembly wherein the tube is subjected to compressive stress while the sleeve is subjected to tensile stress to insure tight engagement along their interface.

In accordance with another aspect of this invention at least the portion of the sleeves spaced from the weld are provided with a lubricant film so that radial support can be provided for the tube without producing stress concentrations or wear even when the loading applied to the tubing system tends to produce relative movement between the sleeve and tube. Such a lubricating film is particularly desirable when the materials forming the coupling have a tendency to gall and fret when relative sliding movement between surfaces occur. For example, titanium tends to present this problem and the lubricating film virtually eliminates such problem.

DETAILED DESCRIPTION OF THE DRAWINGS

Figure 1:
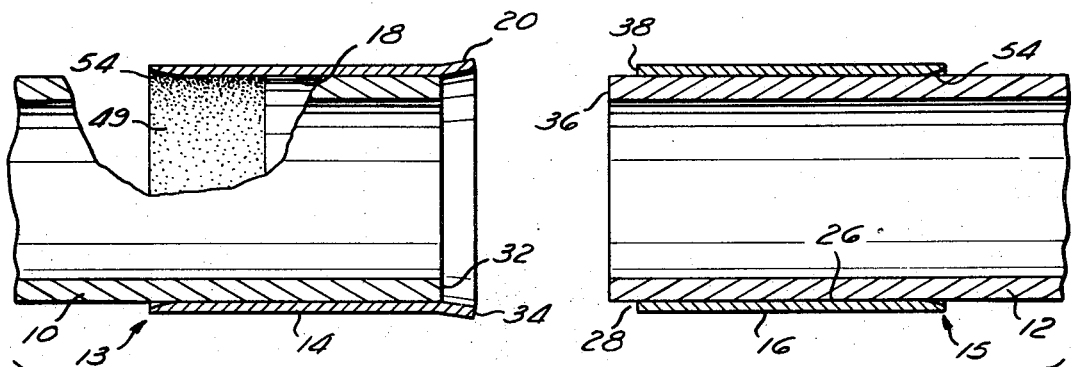
FIG. 1 is a longitudinal section of two pieces of tubing fitted with the female and male coupling sleeves of this invention prior to roll swaging with one tube broken away to illustrate the lubricating coating.
Figure 2:
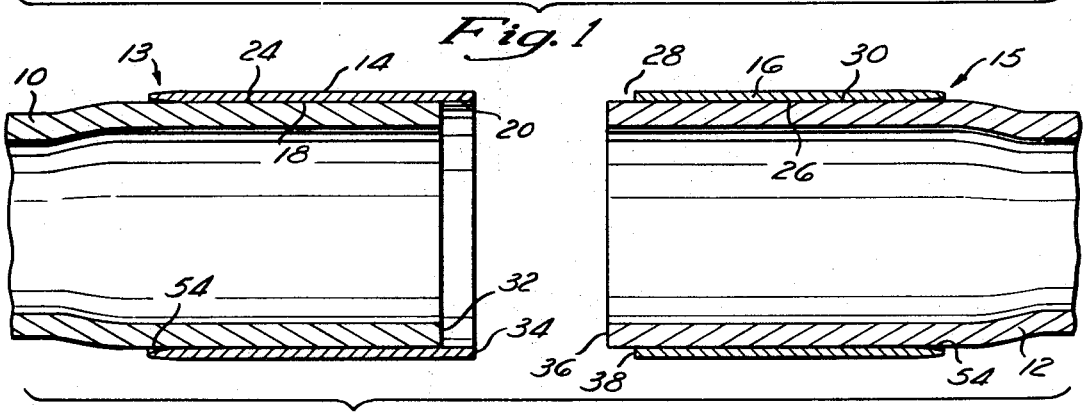
FIG. 2 is a longitudinal section similar to FIG. 1 after the roll swaging process has been performed to lock the sleeves on their associated tubes.
Figure 3:
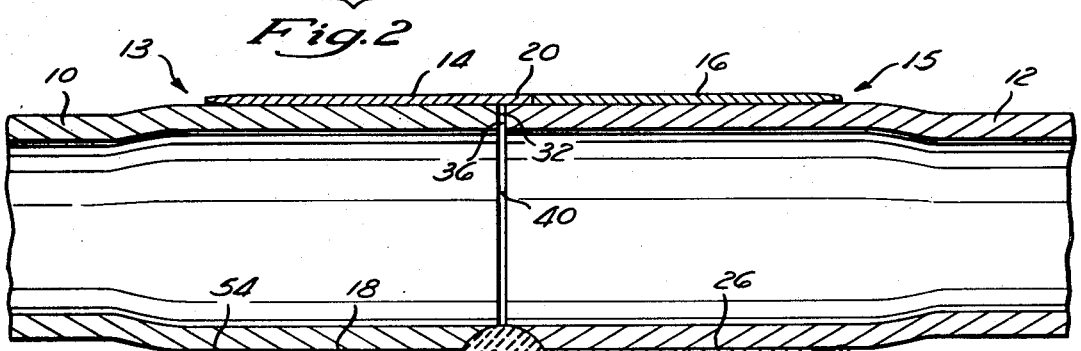
FIG. 3 is a longitudinal composite section illustrating in its upper portion the coupling halves positioned for welding and in its lower portion the completed welded connection.

Referring to FIGS. 1 through 3 of the drawings in greater detail, two similar pieces of tubing 10 and 12 fitted with coupling sleeves 14 and 16 so as to form a female coupling half assembly 13 and a male coupling half assembly 15. The coupling sleeve 14 is initially formed with central bore 18 having a suitable diameter so as to slip over the tube 10 with a relatively close fit. As illustrated in FIG. 1 the axially extending portion 20 of the sleeve 14 is outwardly flared to an appropriate degree so that when the tube 10 is expanded by roll swaging to the assembled condition illustrated in FIG. 2, the axially extending portion 20 and the remaining portion of the sleeve 14 have a substantially cylindrical configuration. As shown in FIG. 2, the sleeve 14 has an expanded inside diameter substantially equal to the outside diameter 24 of the expanded adjacent tube 10 along the entire sleeve length. The drawings exaggerate the degree of expansion for illustration purposes and it should be noted that the tube member is preferably expanded so as to obtain about 3 to 5 percent reduction in wall thickness when the tubing is formed of titanium or the like.

The male assembly or coupling half 15 is formed by the tube 12 and the sleeve 16. The sleeve 16 is also initially formed with a central bore 26 proportioned to slip over the tube 12 with a relatively close fit. The sleeve 16 is properly positioned around the tube 12 so as to provide a circumferential exterior recess, generally indicated at 28. The tube 12 is similarly expanded by roll swaging into the sleeve 16 so as to provide an expanded outside tube diameter 30 substantially equal to the outside tube diameter 24 of the expanded female assembly 13 as shown in FIG. 2.

The axially extending portion 20 of the sleeve 14 has a greater axial length as measured from the end face 32 of the adjacent tube 10 to the end surface 34 of the extending portion than the corresponding axial depth of the circumferential exterior recess 28 as measured from the end face 36 of the tube 12 to the end surface 38 of the adjacent sleeve 16. The telescoped portion of the mating assemblies has an axial length of from about 0.030 to about 0.040. However, the drawings exaggerate the dimensions for purposes of clarity. When the mating assemblies are placed in abutting engagement, the interior tub end faces 32 and 36 are separated by a space 40, defined by the end faces 32 and 36, and the interior surface of the sleeve 14, as best shown in the upper portion of FIG. 3. The space 40 has an axial length of about 0.002 to 0.006 inches and this dimension has again been exaggerated in the drawing for purposes of clarity. This space is provided to facilitate an inert gas purge prior to the welding operation so as to prevent contamination of the weld.

When the interfitting mating surfaces of the assemblies are engaged, axial and radial alignment is assured. Radial alignment is necessary before the end of the tube 12 can move into the sleeve 14. Similarly, the tubes must be axially aligned if the two sleeve end faces 34 and 38 engage around the entire periphery. Therefore, a visual inspection can be used to determine if the two halves are properly positioned.

When the mating assemblies are properly engaged, as determined by visual or manual inspection, the joint formed by the abutting end surfaces 34 and 38 of the coupling sleeves 14 and 16 will lie in a predetermined spaced relationship with respect to the space 40 between the end faces 32 and 36 of the tube members 10 and 12. Thus, the joint also serves as a visual means to accurately locate the electrode during a fusion welding process. Accordingly, the mating assembly members may be joined by a single weld bead 42 produced by externally applying fusion heat substantially along the joint, as shown in the lower portion of FIG. 3. The weld bead extends from the inner surface of the tube members to the exterior surfaces of the assemblies. The width of the weld bead at its inner radial extremity is larger than the width of the space 40 previously separating the tube end faces and the tube members are also fused by the single weld. At the exterior surfaces of the assembly, the width of the weld bead 42 is at least equal to about twice the axial spacing between the space 40 and the sleeve end surface so that a single unitary structure results.

The following are examples of specific dimensions which have been used for the manufacture of a welded tube coupling for titanium tubing. The sleeves in each case were formed of the same material as the tube. For a 3/16 inch tubing having a wall thickness of 0.016 inches, the sleeves were provided initially having an inside diameter of about 0.193 inches and a wall thickness of about 0.07 inches. The male sleeve length was about 0.25 inches and the female sleeve length was about 0.31 inches. In another weld coupling for ⅝ inch titanium tubing having a wall thickness of 0.036 inches, the sleeves were provided with an inside diameter of about 0.632 inches and a wall thickness of about 0.014 inches. In this instance, the male sleeve had a length of about 0.657 inches and the female sleeve had a length of about 0.717 inches.

In each of the above examples the sleeves were positioned over the ends of the associated tubes and the tubes were internally swaged to increase their diameter until the thickness of the tube wall was reduced about 4 percent.

As illustrated in the above embodiment of this invention, the male-female interlocking arrangement characterized by single lip mating permitted the use of a coupling sleeve having a wall thickness substantially less than that of the adjacent tube and approaching about one-third the thickness thereof. Consequently, the total wall thickness was not greatly increased and stress concentration problems were not particularly significant. A coupling in accordance with this invention provides support in the heat weakened weld zone with a minimum increase in the stress concentration problems. In addition, the reduction in total wall thickness at the weld location, as compared to coupling arrangements formerly known in the art, alleviates the weld puddle problem since less heat is required to penetrate the total wall.

Figure 4:
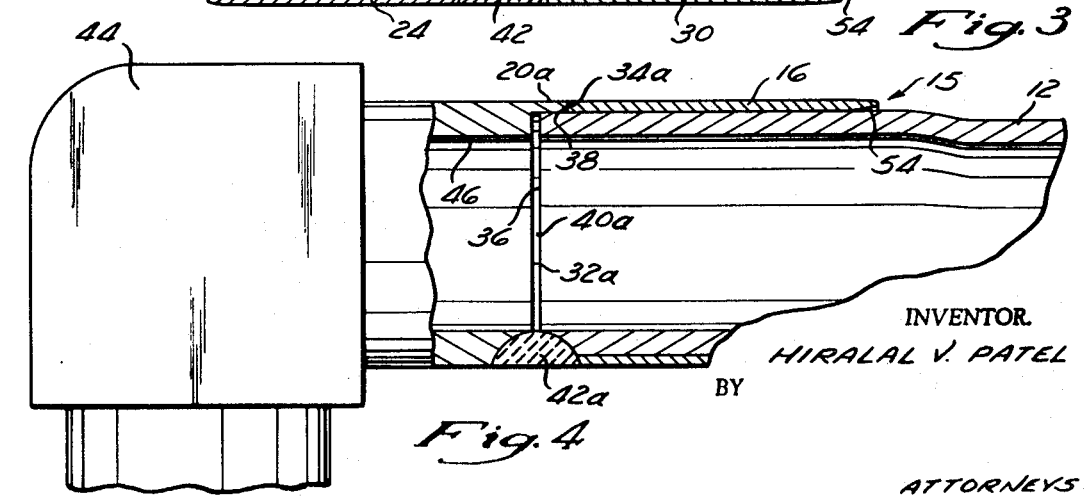
FIG. 4 is a composite view, partially in longitudinal section, illustrating an embodiment in which a coupling half is joined to an elbow fitting with the upper portion of this figure again illustrating the structure prior to the welding operation and the lower portion of the figure illustrating the structure after the welding operation has been performed.

Another embodiment of this invention is illustrated in FIG. 4, which shows an expanded tube identical in structure to the tube 12 and a sleeve identical to the sleeve 16, as shown in FIGS. 2 and 3. However, in this embodiment, the coupling connects the tube to an elbow fitting 44. Of course, other types of fittings can be provided and the elbow 44 is illustrated only by way of example. The elbow 44 has a central bore 46 having a diameter equal to the inner diameter of the tube 12. As shown in FIG. 4, the elbow provides a female mating assembly in this embodiment and includes an axially extending portion 20a having an end surface 34a abutting the end surface 38 of the sleeve 16 in a fashion identical to that of the above embodiment. The axially extending portion 20a and the circumferential exterior recess are similarly proportioned so that a space 40a exists between the end face 36 of the tube 12 and the end face 32a which corresponds to the end face of the tube 10 in the above embodiment.

The mating assemblies again provide for precise axial and radial alignment which may be visually inspected by the joint formed by the abutting end surfaces 34a and 38 on the outer periphery of the assembly. The space 40a is similarly provided to facilitate purging the weld area with a suitable gas. THe mating assembles, specifically the elbow 44, the tube 12, and the sleeve 16 are joined by a single fusion weld bead 42a illustrated in the lower portion of FIG. 4. The weld bead 42a has a larger axial width at its inner extremities than the space 40a and a width at the outer surface of the mating assemblies at least equal to about twice the axial spacing between the space 40a and the abutting end surfaces 34a and 38, so that the mating assemblies are joined in a manner identical to that in the above embodiment. Although the embodiment illustrated in FIG. 4 provided the female assembly, it may have similarly provided the male assembly.

In many systems the tubing is subjected to vibration and/or torsional loads which tend to produce twisting and bending of the tube. Since the sleeves are anchored only at the weld interface such loading is not directly applied along the length of each of the sleeves and relative movement tends to occur between the sleeves and the adjacent tube surfaces with the amount of movement increasing with increased spacing form the weld. In many such instances, it is very desirable to provide a lubricating coating 49 (illustrated in FIG. 1) along the interengaging surfaces between each sleeve and the associated tube, at least along the interface at locations spaced from the weld. This is particularly desirable when the coupling is used to join materials such as titanium which tend to gall or fret under working conditions. Preferably, the interior portion of each sleeve, extending axially from the end surface remote from the tube end for a distance equal to about one-fourth to one-half of the total sleeve length is provided with a dry lubricant coating 49.

Because the sleeve is subjected to relatively high temperatures during welding normal liquid film lubricants are not generally satisfactory. For this reason, it is preferable to use a dry lubricant film in which finely divided solid lubricant materials are dispersed in a bonding vehicle. Such vehicle is usually organic and serves to hold the lubricant material in place at least until the welding is completed. The binder by be of the type that drys such as by solvent evaporation, with or without the application of heat, or may be of a type which is cured by a chemical reaction.

Under the thermal conditions occurring during welding, the binder may partially or completely decompose. However, since a tight interengagement is provided along the interface in which the lubricant is located, it is not necessary in all instances for the binder to maintain its binding function since such interengagement will retain the lubricant in place.

The solid lubricants may be of any known type such as $MoS_2$, $Sb_2O_3$, or graphite or mixtures thereof. The resin binder may be any film forming material of a type known to those in the art. A satisfactory lubricating film has been obtained by surface treatment of the sleeve which employed a vapor blast with 220 grid aluminum oxide before applying the dry lubricant coating. A coating consisting of an epoxy bonded dry film lubricant containing $MoS_2$ and $Sb_2O_3$ was then applied according to the process identified as "Dow-Corning Process No. 1-3930". It was found that titanium couplings provided with such coating, when compared to similar couplings without the coating, were capable of absorbing far greater numbers of cycles of vibration and loading without failure.

Preferably, the coating is applied along both the inner and outer surfaces of each sleeve. When this is done the coating along the exterior surface provides a visual indication which may be used to properly orient the sleeve with respect to the tube during assembly. The coating may be applied to the tube end underlying the sleeve. However, in most cases such coating on the tube should terminate at a location spaced from the end of the tube so that the coating does not contaminate the weld.

In order to minimize the presence of stress concentration, it is also preferable to provide a generous radius 54 along the inner surface of each of the sleeves adjacent to their ends remote from the weld. THis radius eliminates the sharply defined boundary line between the sleeves and the adjacent tube and thereby minimizes the presence of stress concentrations.

Although preferred embodiments of this invention are disclosed, it is to be understood that various modifications and rearrangements of parts may be resorted to without departing from the scope of the invention disclosed.

What is claimed is:

1. A method of forming a welded joint between a tube and a tubular mating part assembly, comprising forming a tube end assembly including a tube extending to an end face, positioning a sleeve having an end surface around said tube tightly engaging the outer surface thereof along an interface therebetween and adjacent to one end of said tube so that said tube end assembly includes said end face extending radially outward from the inner surface of the tube and an end surface extending radially inward from the outermost surface of said tube end assembly at a location axially spaced from said end face and a cylindrical surface extending between the associated end face and end surface, placing said tube end assembly in abutting engagement with said tubular mating part assembly also having an interfitting similar end face, end surface and cylindrical surface proportioned to telescope with said cylindrical surface of said tube end assembly so as to axially and radially align said assemblies, providing a greater axial spacing between said end face and end surface of one of said assemblies than that of the other assembly so that said end faces are spaced when said end surfaces are in abutting engagement, and applying fusion heat along the joint between said abutting end surfaces to form a single weld bead extending the entire radial distance from the inner surface of said tube to the outer surface of said assemblies and having a width at said inner surface at least equal to the spacing between said end faces and a width at the outer surface at least equal to twice said axial spacing between said end face and end surface so that the weld encompasses both the end faces and the end surfaces.

2. A method of forming a welded joint as set forth in claim 1 wherein said mating part assembly is formed by a second tube and a second sleeve positioned around said tube in tight engagement therewith.

3. A method of forming a welded joint as set forth in claim 1 wherein said sleeve is initially formed to freely fit over said tube and is secured to said tube by swaging said tube from its inside to increase the diameter of said tube and cause tight engagement between said sleeve and tube.

4. A method of forming a welded joint as set forth in claim 3 wherein said sleeve projects beyond said end face to provide a projecting portion, said projecting portion before swaging is flared outward and said swaging increases the diameter of said sleeve until said projecting portion is cylindrical.

5. A method of forming a welded joint as set forth in claim 1 wherein a lubricating film is applied along a substantial axial portion of said interface, said lubricating film extending from the end of said sleeve remote from said end surface along such interface toward said end surface and terminating at a location spaced from said end surface.

6. A method of forming a welded joint as set forth in claim 5 wherein said lubricating film is a dry film coating applied to said sleeve.

7. A method of forming a welded joint as set forth in claim 5 wherein said lubricating film is a dry film coating applied to said tube.

* * * * *